Figure 1:
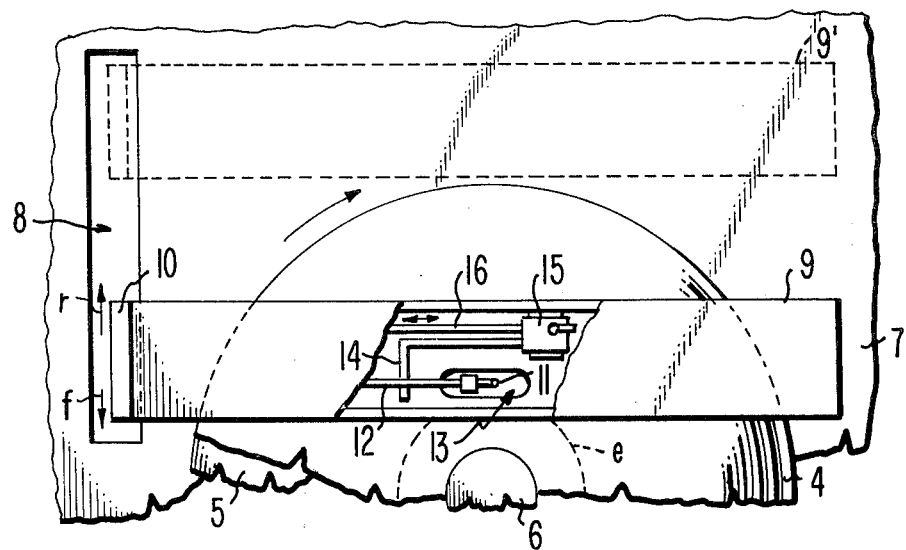

United States Patent [19]

Baker

[11] 4,017,678

[45] Apr. 12, 1977

[54] END-OF-PLAY CONTROL SYSTEM

[75] Inventor: Alfred Lynn Baker, Indianapolis, Ind.

[73] Assignee: RCA Corporation, New York, N.Y.

[22] Filed: June 26, 1975

[21] Appl. No.: 590,483

[30] Foreign Application Priority Data

Nov. 18, 1974 United Kingdom ............. 49922/74

[52] U.S. Cl. ........................ 358/128; 179/100.4 D; 179/100.4 M
[51] Int. Cl.² ......................................... H04N 5/76
[58] Field of Search .... 178/6.6 R, 6.6 DD, 6.6 DC; 179/100.3 V, 100.1 B, 100.4 D, 100.4 M; 360/38; 358/8

[56] References Cited

UNITED STATES PATENTS 3,843,850 10/1974 Takahashi et al. ......... 179/100.4 D
3,864,733 2/1975 Boltz, Jr. ............................ 360/38
3,936,619 2/1976 Sugimoto .................... 179/100.4 D Primary Examiner—Raymond F. Cardillo, Jr.
Attorney, Agent, or Firm—Eugene M. Whitacre; William H. Meagher

[57] ABSTRACT

Video disc player pickup circuit recovers picture information in the form of carrier waves, the instantaneous frequency of which varies over a given deviation range in accordance with the amplitude of composite color video signals, in the course of pickup tracking of successive convolutions of the disc record's groove. Succeeding the innermost groove convolution containing recorded picture information are a plurality of groove convolutions containing an end-of-recording signal comprising unmodulated carrier waves at a given instantaneous frequency within said deviation range. Signal processing circuitry of the video disc player includes a sync separator for separating a deflection synchronizing component from the composite color video signals recovered during playback of the groove convolutions containing picture information. Video disc player also includes a defect detector monitoring carrier frequency departures from the given deviation range, and a squelch signal generator responsive to the output of the defect detector. An end-of-play signal generator responds to the continuance for a given time interval of a simultaneous absence of outputs from sync separator and squelch signal generator by generating an end-of-play signal, which is utilized to terminate record playback efforts and to restore pickup apparatus to a rest position.

13 Claims, 3 Drawing Figures

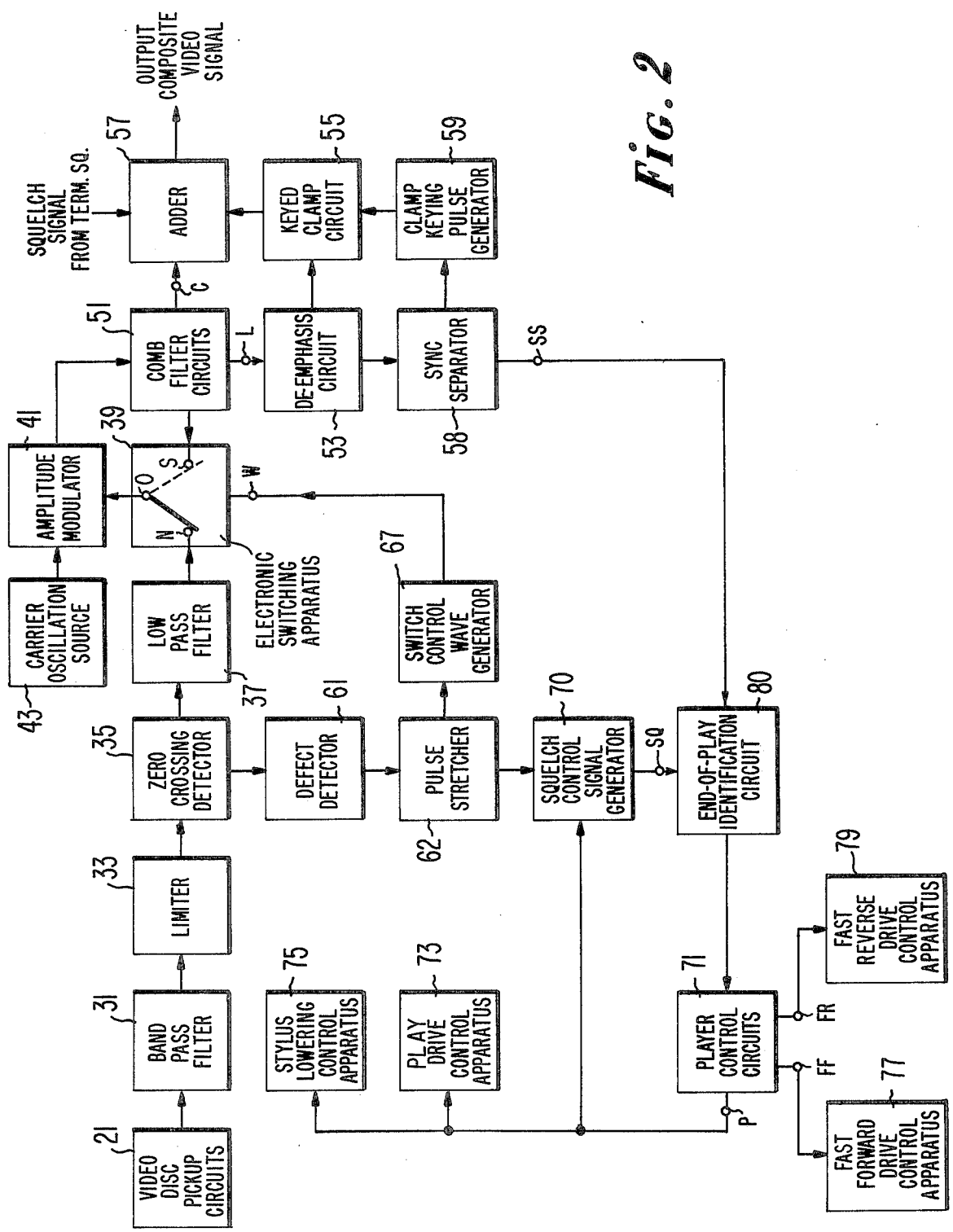

END-OF-PLAY CONTROL SYSTEM

The present invention relates generally to disc players and particularly to novel systems usable in such players in the termination of playback operations upon the conclusion of recorded information pickup.

In U.S. Pat. No. 3,842,194, issued to Jon K. Clemens on Oct. 15, 1974, a video disc recording/playback system is disclosed in which recorded information appears in the form of geometric variations in the bottom of a spiral groove in the surface of a disc substrate covered by a conductive coating, with a dielectric layer overlying the conductive coating. A playback stylus, including a conductive electrode affixed to an insulating support, is received in the record groove. The stylus is supported by a pickup arm mounted in an enclosure which is driven radially (with respect to the rotating turntable upon which the record is received) to facilitate tracking of successive convolutions of the record groove with a substantially constant stylus attitude. The stylus electrode cooperates with the disc coatings to form a capacitance which varies, as the disc is rotated, in accordance with the groove bottom geometry variations passing beneath the stylus electrode. Appropriate circuitry coupled to the stylus electrode translates the capacitance variations to electrical signal variations representative of the recorded information.

In a desirable form of the above-described capacitive video disc system, the recorded picture information comprises a carrier frequency modulated in accordance with composite video signals and appears in the form of successive groove bottom depth alternations between maximum and minimum depths.

It is convenient for record-changing purposes in disc players of the aforementioned type to provide means for recognizing when the tracking pickup has passed the concluding segment of the recorded picture information, and means responsive to such recognition for terminating the groove tracking action and for returning the pickup assembly to a rest position clear of the turntable. The present invention is directed to a system providing such end-of-play control through the use of player circuits cooperating with an end-of-recording signal, occupying a plurality of record groove convolutions subsequent to the groove convolution containing the final seqment of recorded picture information.

In accordance with an advantageous embodiment of the present invention, identification of end-of-play conditions is the function of apparatus responding to outputs of a sync separator and a squelch signal generator incorporated in the video disc player. The identification apparatus develops an output when an absence of both separated sync signals and squelch signals endures for a given time interval, which is long relative to a field interval (e.g., 150 milliseconds). The identification criteria serve to reliably distinguish the output of the player's pickup circuits developed in response to an end-of-recording signal comprising undeviating carrier waves of a frequency falling within the normal picture carrier deviation range, from the ouput of the pickup circuits developed under all other conditions of player operation. In the illustrative embodiment, the identification apparatus output serves to effect (1) disabling of apparatus providing forward drive of the pickup enclosure, (2) enabling of apparatus providing a fast reverse drive of the pickup enclosure; and (3) removal of the stylus from its playback position.

The squelch signal generator, to which the identification apparatus is responsive, may advantageously take the form disclosed in my copending application, Ser. No. 590,484, entitled "Squelch Circuit", and concurrently filed herewith. In the therein disclosed form of generator, squelching signal development is (a) responsive to an output of a defect detector, monitoring departures of the instantaneous frequency of the input of the player's picture carrier FM detector from an intended picture carrier deviation range; and (b) responsive to an indication of controlled removal of the pickup stylus from a playback position.

Figure 3:
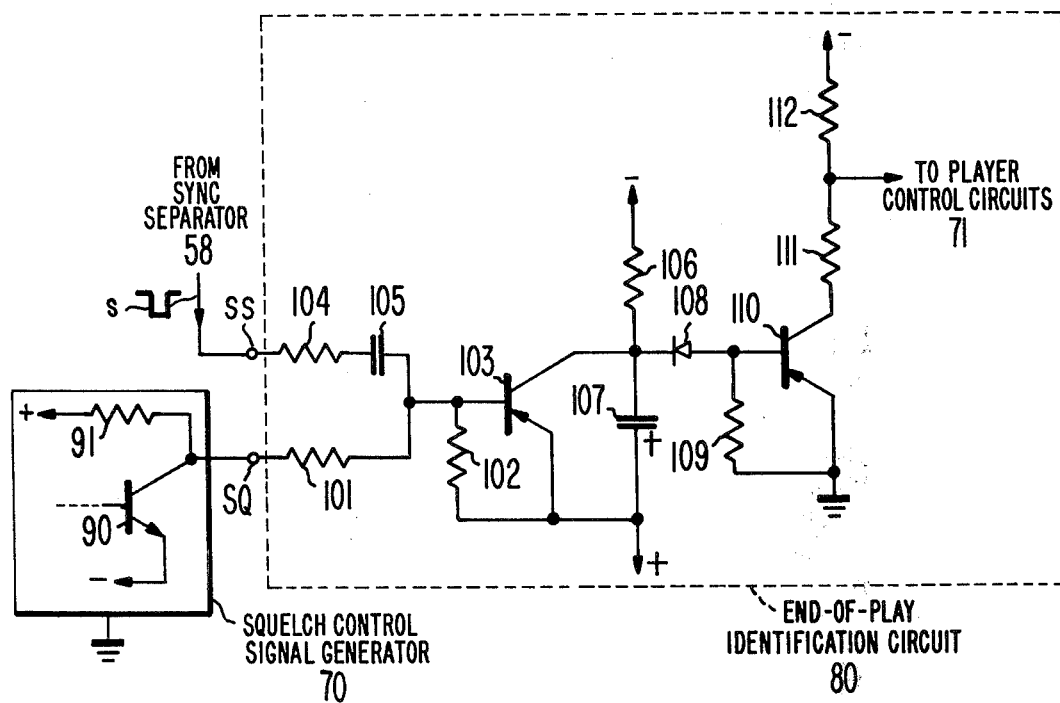

The sync separator, to which the identification apparatus is responsive, is desirably disposed in the player's signal processing circuits in the manner described in my copending application Ser. No. 590,485, entitled "Sync-Responsive Systems for Video Disc Players", and concurrently filed herewith. In the disposition therein disclosed, the output of a chrominance signal rejecting comb filter is subjected to video frequency de-emphasis processing prior to use as the sync separator input, and the comb filter circuitry is associated with a defect compensation system employing stored signal substitution under defect pickup conditions. Objects and advantages of the present invention will be readily recognized by those skilled in the art upon a reading of the following detailed description, and an inspection of the accompanying drawings in which:

FIG. 1 provides a plan view, partially broken away, of a portion of the structure of a video disc player in which practice of the present invention may be carried out;

FIG. 2 illustrates, by block diagram representation, a circuit arrangement for the FIG. 1 video disc player, incorporating an end-of-play control system in accordance with the principles of the present invention; and FIG. 3 illustrates schematically an illustrative form for apparatus performing an end-of-play identification function in the FIG. 2 arrangement, pursuant to a specific embodiment of the present invention.

In FIG. 1, a disc 4, illustratively a video disc of a type generally described in the aforesaid Clemens patent, is shown during its playback supported by a turntable 5 rotating above a motorboard 7, with the disc's central aperture centered about a spindle 6. A stylus 11, having its tip received in the record groove, is supported at one end of a pickup arm structure 12. The pickup arm structure 12, which may illustratively be of the form shown in a copending application of Byron K. Taylor, Ser. No. 522,814, now U.S. Pat. No. 3,956,581, is pivotally supported at its opposite end (not shown) within an enclosure 9.

The enclosure 9 is secured to a bracket 10 which extends through a slot 8 in the motorboard 7. Beneath the motorboard 7 is apparatus (not shown) for selectively supplying drive to the enclosure 9 via the bracket 10. Illustratively, the drive apparatus is of the form shown in U.S. Pat. No. 3,870,320, issued to L. Torrington on Mar. 11, 1975, permitting selection of: (a) radial drive in a forward direction ("f", in the drawing) at a first, "play" speed, so related to the turntable rotation speed as to facilitate stylus tracking of successive convolutions of the record groove with a substantially constant stylus attitude; (b) radial drive in direction "f", at a second, "fast forward" speed, higher than said "play" speed; and (c) radial drive in the reverse direction ("r", in the drawing) at a "fast reverse" speed, comparable to said fast forward speed. A rest position for the enclosure 9, which is clear of turntable 5 to facilitate record placement and removal, is shown by the discontinuous outline designated 9'.

Additionally mounted in the enclosure 9 is rotor 15, to which is secured a bellcrank lever 14, having a portion extending beneath the pickup arm structure 12 at an intermediate point thereof. Rotating of rotor 15, by a cable 16 secured thereto, permits movement of the bellcrank lever between: (1) a depressed position permitting downward pivoting of the pickup arm structure 12 to a play position in which the stylus end of the arm structure protrudes through an aperture 13 in the bottom of enclosure 9 to a degree permitting engagement of the tip of stylus 11 with the groove of disc 4; and (2) an elevated position, such that the stylus is removed from groove engagement and retracted within enclosure 9.

Shown by a dotted line "e" on the surface of disc 4 is an illustrative location of the record groove convolution containing the final segment of recorded picture information. In succeeding convolutions of the record groove, progressing inwardly from location "e", there is present an end-of-recording signal such as previously described.

In FIG. 2, a player circuit arrangement is depicted which may be advantageously employed in video disc player apparatus of the FIG. 1 form. In the FIG. 2 arrangement, recorded signal is recovered during playback of a video disc by video disc pickup circuits 21, which may be, for example, as described in U.S. Pat. No. 3,872,240, issued to D. J. Carlson, et al. on Mar. 18, 1975. Illustratively, the recording format for the disc is such that the recovered signal (during traversal of groove convolutions up to location "e") normally includes a frequency modulated picture carrier, the instantaneous carrier frequency deviating within fixed deviation range limits (e.g., 3.9 – 6.9 MHz.) in accordance with the amplitude of a composite color video signal occupying a band of frequencies (e.g., 0–3 MHz.) below the deviation range, and representative of a succession of color images to be displayed. During traversal of groove convolutions subsequent to location e, the recovered signal normally comprises undeviated carrier waves at a frequency within said deviation range limits. Illustratively, the frequency chosen for the end-of-recording signal corresponds to the carrier value normally representative of "black level" (e.g., 5 MHz.).

A bandpass filter 31, having a pass band encompassing the picture carrier deviation range and appropriate sidebands thereof, selectively passes the frequency modulated picture carrier components in the output of pickup circuits 21 to a limiter 33. The limiter output is applied to a zero-crossing detector 35. The zero-crossing detector may comprise circuits of well-known type for developing an output pulse of a fixed amplitude, width and polarity in response to each zero-crossing of the limited input FM signal. The pulse output of the zero-crossing detector 35 is supplied to a low pass filter 37, having a pass band substantially matching the band (e.g., 0–3 MHz) occupied by the recorded video signal information.

The zero-crossing detector 35 and low pass filter 37 form an FM detector of a so-called pulse counter type, providing an output in the form of a composite video signal corresponding to the modulation of the input FM signal. Illustratively, the video signal information recovered from the disc comprises a composite color video signal encoded in a "buried subcarrier" format, as disclosed in U.S. Pat. No. 3,872,498, issued to D. H. Pritchard on Mar. 18, 1975.

For purposes of illustration, the following parameters may be assumed to be descriptive of the buried subcarrier form of the recorded composite color video signal: (1) Color subcarrier frequency $(f_b) = (195/2)f_H$, for approximately 1.53MHz, when the line frequency $(f_H)$ corresponds on the U.S. standard for color television broadcasting; (2) Chrominance signal: sum of respective quadrature related subcarrier phases respectively amplitude modulated with red and blue color difference signal (R-Y, B-Y) of 0–500 KHz bandwidth, with equal bandwidth (500 KHz) upper and lower sidebands preserved (and carrier suppressed); (3) Luminance signal (Y) bandwidth: 0–3 MHz; (4) Color synchronizing component: burst of oscillations at buried subcarrier frequency $(f_b)$ of reference phase and amplitude, during horizontal blanking "backporch" (corresponding to standard NTSC color synchronizing component in all but frequency).

Also responding to an output of the zero-crossing detector 35 is a defect detector 61, which may, illustratively, be of the type shown in the copending U.S. patent application of J. K. Clemens, et al., Ser. No. 477,102, filed June 6, 1974. Defect indication pulses developed by the defect detector 61 are supplied via a pulse stretcher 62 to a switch control wave generator 67, which develops signals for controlling the switching state of electronic switching apparatus 39. Reference may be made to the copending U.S. Patent Application of A. L. Baker, Ser. No. 477,103, now U.S. Pat. No. 3,909,518, for a detailed description of the pulse stretcher function, and of suitable apparatus for performing the functions of generator 67 and switching apparatus 39.

Electronic switching apparatus 39 serves the purpose of alternatively: (1) completing a signal path between a "normal" signal input terminal N and the switching apparatus output terminal 0, or (2) completing a signal path between a "substitution" signal input terminal S and the output terminal 0. Switching between the respective normal and substitution states is controlled by the output of switch control wave generator 67, which is applied to the control signal input terminal W of the switching apparatus 39. The output terminal 0 of the switching apparatus 39 is coupled to the modulating signal input terminal of an amplitude modulator 41. The normal input signal to the switching apparatus 39 (i.e., the signal applied to terminal N, and conveyed therefrom to the modulating signal input terminal of modulator 41 during the normal mode of operation of the video disc player) is the composite video signal output of the low pass filter 37. The substitution input signal (i.e., the signal applied to terminal S, and conveyed therefrom to the modulating signal input terminal of modulator 41 during a defect masking, or "substitution" mode of operation of the player) is a delayed composite video signal derived in a manner to be subsequently described.

Amplitude modulator 41 serves to modulate the amplitude of carrier waves, supplied by a carrier oscillation source 43, in accordance with the signals delivered from the switching apparatus output terminal 0. Amplitude modulator 43 is desirably of the singly balanced type (balanced against the modulating signal). The nominal frequency $(f_c)$ of the carrier waves suppled by source 43 corresponds to the sum of the buried subcarrier frequency $(f_b)$ and a desired output subcarrier frequency ($f_o$), and illustratively corresponds to $325 f_H$, or approximately 5.11 MHz (for the instance where the desired output subcarrier frequency corresponds to the NTSC subcarrier frequency of $(455/2) f_H$, or approximately 3.58 MHz).

Desirably, the frequency of the carrier waves developed by oscillator 43 varies about the aforesaid nominal frequency in consonance with the "jitter" of the frequencies of the composite video signal recovered during record playback. For this purpose, the source 43 may be realized desirably in the form of a phase locked loop system, such as disclosed in U.S. Pat. No. 3,872,497, issued to J. G. Amery, et al. on Mar. 18, 1975.

The amplitude modulated carrier wave output of modulator 41 is applied to the input of comb filter circuits 51, which are illustratively of the type described in a copending U.S. Patent application of J. G. Amery, Ser. No. 570,325, now U.S. Pat. No. 3,964,757. The comb filter circuits 51 develop: (a) at output terminal C, a separated chrominance signal component in the highband location desired for output use, suitable for application to an output composite signal forming circuit (constituted by an adder 57); (b) at output terminal L, a separated luminance signal component; and (c) a delayed composite video signal which serves as the substitution signal input to terminal S of switching apparatus 39.

The luminance signal developed at terminal L is supplied to a de-emphasis circuit 53 which provides a de-emphasis of luminance component high frequencies in a manner suitably complementary to the pre-emphasis thereof employed in the disc recording operation. The output of the de-emphasis circuit 53 is applied to a clamp circuit 55, which serves to restore the DC component of the luminance signal. Illustratively, the clamp circuit 55 is of the keyed clamp type, and keyed by periodic, line rate, keying pulses timed to coincide with periodic reference amplitude intervals of the luminance signal (e.g., during horizontal sync tip appearances).

The clamped output of circuit 55 forms the luminance component input to adder 57, which serves to add such input to the highband chrominance component output at terminal C to develop an output composite color video signal of a form suitable for application to a color television receiver. Where such application is to be to the receiver's antenna terminals, the output of adder 57 may serve as the composite video signal input to transmitter apparatus of such a form, for example, as is shown in the aforesaid U.S. Pat. No. 3,775,555, issued to D. J. Carlson.

The player apparatus of FIG. 2 also includes a sync separator 58, disposed to be responsive to the output of de-emphasis circuit 53 and serving to separate deflection synchronizing components from the picture-representative signal components of the luminance comb filter output. An output of sync separator 58 is supplied to a clamp keying pulse generator 59 to accurately time the generation of keying pulses for application to the above-discussed keyed clamp circuit 55. Reference may be made to my aforementioned copending U.S. Patent application, Ser. No. 590,485, entitled "Sync Responsive Systems For Video Disc Player", for an illustration of suitable apparatus for performing the functions of separator 58 and generator 59.

The player arrangement of FIG. 2 also includes a squelch control signal generator 70, which is desirably of the form disclosed in my aforementioned copending U.S. patent application Ser. No. 590,484, entitled "Squelch Circuit" and concurrently filed herewith. The generator 70 receives, as one input, a stretched defect indication pulse output of the previously discussed pulse stretcher 62, and, as a second input, a control output of player control circuits 71, developed at terminal P for application to play drive control apparatus 73 and stylus lowering control apparatus 75.

Player control circuits 71 develop at terminal P, when a play mode of operation is to be established for the video disc player, an enabling potential which serves to actuate the play drive control apparatus 73 and stylus lowering control apparatus 75. The result, with reference to the illustrative structure of FIG. 1, is: (a) a rotation of rotor 15 and bellcrank lever 14 that allows a downward pivoting of stylus arm 12 to a position permitting record groove reception of the tip of stylus 11; and (b) engagement of a drive via bracket 10 that establishes a radial motion for enclosure 9 in the forward direcion $f$ at a speed appropriate to groove tracking with a substantially constant stylus attitude.

However, for other operating modes (e.g., pause, search, etc.) of the player arrangement of FIG. 2, the player control circuits 71 are arranged to supply a disabling potential at terminal P which serves to deactivate the play drive control apparatus 73 and the stylus lowering apparatus 75. The deactivation results in: (a) an opposite direction rotation of rotor 15 (FIG. 1) that causes elevation of stylus arm 12 by lever 14, removing stylus 11 from record groove engagement; and (b) disengagement of enclosure 9 and bracket 10 from the apparatus supplying forward radial drive at the normal play speed.

The player control circuits 71 have additional output terminals FF and FR (respectively coupled to a fast forward drive control apparatus 77 and a fast reverse drive control apparatus 79) to which enabling potentials are selectively applied when appropriate to selected modes of operation other than play. When an enabling potential is developed at terminal FF, engagement of a drive via bracket 10 (FIG. 1) is established that provides radial motion for enclosure 9 in the forward direction $f$ at a speed higher than the aforementioned play speed. When an enabling potential is developed at terminal FR, engagement of a drive via bracket 10 is established that provides radial motion for enclosure 9 in the reverse direction $r$ at a speed higher than the play speed.

The squelch control signal generator 70 is arranged to develop a squelch signal at its output terminal SQ whenever a stretched defect indication pulse input from pulse stretcher 62 endures beyond a given time interval which is long relative to a line interval (e.g., 50 milliseconds). Generator 70 also provides squelch signal development at terminal SQ substantially immediately whenever the aforesaid disabling potential appears at terminal P. Squelch signals developed at terminal SQ are applied to adder 57 to inhibit the passage of signal information therethrough. In the absence of squelch signal development at terminal SQ, adder 57 is free to develop an output composite video signal by summing the inputs it receives from terminal C and the output of clamp circuit 55.

Pursuant to the principles of the present invention, the player arrangement of FIG. 2 additionally includes an end-of-play identification circuit 80, which is responsive to the output of squelch control signal generator 70 appearing at terminal SQ, and to an output of sync separator 58 appearing at terminal SS. Identification circuit 80 serves to develop an end-of-play control signal whenever an absence of both squelch signals from terminal SQ and sync signals from terminal SS endures for a predetermined time interval (e.g., 150 milliseconds), which interval is desirably long relative to the delay (e.g., 50 milliseconds) associated with squelch signal development in response to a defect indicaton, but which is desirably short relative to the duration (e.g., 8 seconds) of the end-of-recording signal on the disc record 4.

The player control circuits 71 are responsive to the output of identification circuit 80 such that appearance of an end-of-play control signal in the output of the identification circuit 80 triggers control circuits 71 into establishment of a shut-down mode for the player. The shut-down mode establishment by control circuits 71 illustratively includes such operations as (1) development of a disabling potential at terminal P to deactivate the play drive control apparatus 73 and the stylus lowering control apparatus 75, and (2) development of an enabling potential at terminal FR to activate the fast reverse drive control apparatus 79. Desirably, the control circuits 71 include suitable means for latching the control apparatus in the shut-down mode, once established, to allow reverse drive to continue until the rest position (9') for the enclosure 9 is attained, despite the termination of the end-of-play control signal.

FIG. 3 illustrates schematically a particular circuit configuration that may be advantageously employed in performing the functions of the end-of-play identification circuit 80 of FIG. 2. The identification circuit 80 includes an input transistor 103, of PNP type, with its emitter directly returned to a positive potential source, and its collector connected via a resistor 106 to a negative potential source. A resistor 102 is coupled between the base and emitter of transistor 103. Additionally, the base of transistor 103 is coupled (1) by a resistor 101 to the output terminal SQ of the squelch control signal generator 70, and (2) by the series combination of capacitor 105 and resistor 104 to output terminal SS of sync separator 58 (FIG. 2).

The circuit arrangement of the squelch control signal generator 70 is only partially shown in FIG. 3, with the schematically illustrated portion comprising an output transistor 90, of NPN type, with its emitter directly returned to the negative potential source, and its collector connected via a resistor 91 to the positive potential source. Output terminal SQ is directly connected to the collector of transistor 90. When a turn-on potential is supplied to the base of transistor 90 (as, for example, by circuitry of the form shown in my copending application Ser. No. 590,484, entitled "Squelch Circuit") for squelch signal development purposes, transistor 90 is rendered conducting and the potential at terminal SQ drops to the potential of the negative potential source. Under these conditions of squelch signal development, a forward bias is developed across the base-emitter path of transistor 103 which allows its conduction.

The separated sync pulse output of sync separator 58, appearing at terminal SS and coupled to the base of transistor 103 via capacitor 105 and resistor 104, comprises negative-going pulses ("s") of sufficient magnitude to cause conduction by transistor 103 during the appearance of each pulse s. In the absence of both sync pulse appearance at terminal SS and squelch development at terminal SQ, transistor 103 is non-conducting.

A capacitor 107 is connected between the collector and emitter of transistor 103. During periods of non-conduction for transistor 103, capacitor 107 is subject to relatively slow charging via resistor 106, with the potential at the collector of transistor 103 dropping toward the potential of the negative potential source. When transistor 103 conducts, capacitor 107 is rapidly discharged, with the potential at the collector of transistor 103 rising sharply to the potential of the positive potential source.

A diode 108 has its cathode connected to the collector of transistor 103, and its anode connected to the base of an output transistor 110 of a PNP type. The emitter of transistor 110 is directly connected to a point of ground potential, while its collector is connected via the series combination of resistors 111 and 112 to the negative potential source. The junction of resistors 111 and 112 serves as the output terminal of identification circuit 80. A resistor 109 is connected in shunt with the base-emitter path of transistor 110.

During periods of conduction by transistor 103, diode 108 is reverse biased and output transistor 110 is in a nonconducting state. When transistor 103 ceases conduction, the charging of capacitor 107 via resistor 106 commences. If transistor 103 remains cut off for a sufficient length of time to allow charging of capacitor 107 to progress to a point where the potential at the collector of transistor 103 is at a negative level providing forward bias for diode 108 and the base-emitter path of transistor 110, conduction by transistor 110 is initiated, and the potential at the junction of resistors 111 and 112 rises toward ground potential. The player control circuits 71 (FIG. 2) respond to this drop in potential by latching the player in the previously described shut-down mode.

Since transistor 103 is rendered conducting by each sync pulse appearance at terminal SS, one can be assured that a false end-of-play indication will not be developed by identification circuit 80 during normal playback of recorded picture information by choosing a charging time constant for capacitor 107 which is appreciably longer than a line interval. With such a time constant choice, the separated sync pulse appearances, recurring at a line rate, prevent dropping of the potential at the collector of transistor 103 to a level allowing turn-on of output transistor 110.

There are various desirable operating modes for the video disc player of FIGS. 1 and 2, such as pause, forward search, and reverse search, which involve removal of the stylus 11 from its lowered, playback position of record groove contact. Choice of one of these operating modes may result in relatively long periods of time (e.g., exceeding the length of the time interval occupied by an end-of-recording signal) when composite video signals are not recovered by the pickup circuits 21. If the end-of-play identification circuit were solely responsive to absence of separated sync signals, one would encounter undesired, premature terminations of the chosen one of such non-pickup operating modes, as the continued absence of separated sync pulses resulted in tripping of the player control circuits into the shut-down mode. However, since the identification circuit 80 herein is additionally responsive to the squelch signal output of generator 70, such premature terminations are precluded.

In the illustrative arrangement for control of the squelch control signal generator 70, the appearance of a disabling potential at terminal P of control circuits 71 upon the selection of a non-pickup operating mode results substantially immediately in the turn-on of transistor 90 (FIG. 3). The bias thus provided via terminal SQ for transistor 103 ensures its conduction throughout the period of operation in the non-pickup operating mode, thus precluding the false development of an end-of-play control signal by turn-on of transistor 110.

When the player is in a play mode, with an enabling potential appearing at terminal P, the stylus traversal of groove convolutions containing recorded picture information will not result in false end-of-play control signal development, under normal playback conditions, because of the previously mentioned periodic turning on of transistor 103 by sync pulses s. However, when defects are encountered, as described in the aforementioned Clemens, et al. application, periods may ensue during which one cannot reliably count on a periodic appearance of sync pulses at terminal SS. This is particularly so when the defect condition endures for a large number of line intervals, as the stored video information employed for defect compensation tends to deteriorate after a succession of recirculations through switching apparatus 39. Avoidance of false end-of-play signal development under such long defect conditions is, however, achieved in the arrangement herein disclosed, since squelch signal generator 70 is rendered responsive to defect indications of long duration, and transistor 103 of identification circuit 80 is rendered conducting by squelch signal development at terminal SQ. By choosing the time constant for charging of capacitor 107 so that the required cutoff period for transistor 103 (to allow conduction by transistor 110 to initiate) is long relative to the stretched defect pulse duration required for squelch signal development by generator 70, one is substantially assured that false end-of-play signal development will not occur under the noted defect pickup conditions. When the defect condition is such that the stretched defect pulse endures sufficiently to develop a squelch signal, the identification circuit's response to the squelch signal at terminal SQ precludes end-of-play signal development; when a stretched defect pulse does not endure sufficiently to develop a squelch signal, the return to normal playback conditions occurs soon enough that sync pulse reappearance at terminal SS precludes end-of-play signal development.

While protection against false or premature end-of-play control signal development, such as described above, is an important consideration, it is desirable that the protection techniques are compatible with reliable achievement of end-of-play control signal development when stylus traversal of the groove convolutions containing the end-of-recording signal does occur. Such compatibility is achieved in the end-of-play control system herein disclosed.

During stylus traversal of the groove convolutions containing the end-of-recording signal, the player is in the play mode of operation and the signal being developed by pickup circuits 21 comprises a carrier at a frequency within the picture carrier deviation range limits. Under normal playback conditions, these circumstances should preclude squelch signal development by generator 70, since an energizing potential will be appearing at terminal P of control circuits 71, and defect pulse development is not occurring in defect detector 61. Meanwhile, no sync pulses should be appearing at output terminal SS, since the carrier signal being recovered from the record by pickup circuits 21 is undeviated (there being no video or sync signal modulation thereof). Simultaneous absence of both squelch signals and sync pulses for an adequate length of time results in charging of capacitor 107 to a level enabling conduction by transistor 110, and development of an end-of-play control signal which trips control circuits 71 into establishing the desired shut-down mode.

It may be noted that if (in the course of end-of-recording signal pickup) noise should be erroneously interpreted by sync separator 58 as a sync pulse with a resultant false pulse development at terminal SS, end-of-play control signal development by identification circuit 80 will be postponed; if such false pulse development recurs sufficiently often, end-of-play control signal development could be precluded. However, occurrence of such an event is substantially precluded in the arrangement herein disclosed, by virtue of the combined effects of several features:

1. The presence, during normal playback of the end-of-recording signal, in the output of pickup circuits 21 of a carrier signal at a frequency subject to passage through band pass filter 31 to an input of limiter 33, assures development at the limiter output of a relatively noise free output. This is in contrast with the conditions that would exist during stylus traversal of groove convolutions containing no recorded information (e.g., in a system where one sought to develop an end-of-play control signal in response to the total absence of recorded information).

2. The location of sync separator 58 in the player arrangement of FIG. 2, subjects the input to sync separator 58 to noise reducing benefits of the operations of comb filter circuits 51 and de-emphasis circuits 53 (with the former rejecting or substantially attenuating input components falling in a plurality of spaced frequency bands, and the latter substantially attenuating any high frequency noise components it may receive).

3. The sync separator 58, itself, may desirably incorporate a facility for noise rejection, such as is provided by the pulse width discriminating aspect of the sync separator structure disclosed in my aforementioned copending application Ser. No. 590,485, entitled "Sync Responsive Systems For A Video Disc Player".

It may be further noted that if a sufficiently long defect condition is encountered during traversal of the groove convolutions containing the end-of-recording signal, squelch signal development by generator 70 may postpone end-of-play control signal developmemt by identification circuit 80. However, if the charging time constant for capacitor 107 is chosen so that the transistor 103 cutoff duration required for initiating conduction by transistor 110 is quite short relative to the duration of pickup of the end-of-recording signal, the statistical probability of encountering a defect-free interval of the first duration at some time during the long pickup duration is quite high. In practice, it has been found that a 150 millisecond choice for the first duration and a 8 second choice for the end-of-recording signal duration are illustrative of a duration ratio that provides highly reliable assurance of end-of-play control signal development during traversal of the groove convolutions containing the end-of-recording signal.

It is usually desirable that the picture information recorded on a video disc of the aforementioned Clemens type is supplemented by a sound accompaniment. In the copending application of Eugene O. Keizer, Ser. No. 441,069, now U.S. Pat. No. 3,911,476, a video disc system is disclosed wherein (a) picture information, comprising a first carrier, frequency modulated in accordance with the amplitude of a composite color video signal, appears in the form of alternations of the depth of the disc's groove bottom between a maximum depth and a minimum depth, and is accompanied by (b) sound information, comprising a second carrier (appreciably lower in frequency than the lower deviation range limit for the first carrier) frequency modulated in accordance with an audio signal, and appearing in the form of "duty cycle" modulation of the depth alternations. In a modification of the aforesaid Keizer system providing multichannel sound accompaniment, as disclosed in the copending application of J. K. Clemens, et al. Ser. No. 522,811, "duty cycle" modulation is effected in accordance with the sum of a plurality of sound carriers of different frequencies (each being appreciably lower in frequency than the lower deviation range limit for the picture carrier), with each sound carrier subject to frequency modulation in accordance with a respective audio signal. The video disc player for such records includes one or more sound channels (not shown in FIG. 2, for purposes of drawing simplification) for recovering one or more audio signals, as appropriate to the sound reproduction facility to be utilized.

Where a video disc includes a sound accompaniment as above described, the end-of-recording signal is desirably subject to duty cycle modulation in accordance with an undeviated sound carrier (in the single sound track instance) or sum of undeviated sound carriers (in a multiple sound track instance), with the purpose of obtaining sound channel quieting during the stylus traversal of the groove convolutions containing the end-of-recording signal. Each sound carrier deviation range desirably lies outside the passband of bandpass filter 31.

While other choices may be made, the illustrative selection of a black level representative frequency (5 MHz) for the picture carrier component of the end-of-recording signal is advantageous for several reasons:

1. It lies well within the deviation range limits assigned to picture carrier, whereby false interpretation of its presence as a defect (by defect detector 61) is substantially precluded.

2. Because of the video level to which such a picture carrier frequency corresponds, the display screen (e.g., of a color television receiver responding to the player output) will tend to be darkened during the stylus traversal of the groove convolutions containing the end-of-recording signal.

3. Such a frequency choice lies toward the low frequency end of the picture carrier deviation range, whereby recording problems such as "signal track drop" (which can be of greatest severity when recording the highest picture carrier frequencies in the smallest-diameter, inner convolutions of the record groove) are less severe, and a disturbing interference from spurious phase modulation of the picture carrier by an accompanying sound carrier is less likely, than for white-representative frequencies.

An illustrative set of values for the circuit parameters of the FIG. 3 arrangement is as follows:

| | |
|---|---|
| Resistor 91 | 2,700 ohms |
| Resistor 101 | 100,000 ohms |
| Resistor 102 | 22,000 ohms |
| Resistor 104 | 22,000 ohms |
| Resistor 106 | 150,000 ohms |
| Resistor 109 | 22,000 ohms |
| Resistor 111 | 12,000 ohms |
| Resistor 112 | 22,000 ohms |
| Capacitor 105 | 180 picofarads |
| Capacitor 107 | 1.2 microfarads |
| Diode 108 | Type 1N914 |
| Transistor 90 | Type 2N3904 |
| Transistors 103,110 | Type MPSA70 |

What is claimed is:

1. In playback apparatus for a disc record having a spiral groove containing: (1) recorded picture information, comprising carrier waves modulated in frequency over a given frequency deviation range in accordance with composite video signals, inclusive of deflection synchronizing components and picture signal components, said recorded picture information occupying a first plurality of the groove convolutions; and (2) end-of-recording information, comprising undeviated carrier waves at a frequency within said given deviation range, occupying a second plurality of the groove convolution adjacent to said first plurality; the combination comprising:

pickup apparatus for developing, during disc record playback, a carrier wave output in response to traversal of successive disc record groove convolutions:

means responsive to said carrier wave output for recovering said deflection synchronizing components, when present;

means coupled to said pickup apparatus for identifying departures of the instantaneous frequency of the output of said pickup apparatus from said given frequency deviation range;

means, coupled to said identifying means and responsive to a sustained departure from said given deviation range in the output of said pickup apparatus, for developing a squelch signal; and means, responsive to the continuance for a given time period of a simultaneous absence of (1) deflection synchronizing components from the output of said recovering means and (2) squelch signal development by said developing means, for automatically terminating said disc record playback.

2. Apparatus in accordance with claim 1, wherein said pickup apparatus includes a pickup stylus subject to occupancy of a position permitting disc groove engagement by the tip of said stylus, and means for effecting removal of said stylus from said engagement - permitting position; and wherein said squelch signal developing means is additionally responsive to the removal of said stylus from said engagement-permitting position.

3. In playback apparatus for a disc record having a spiral groove containing: (1) recorded picture information, comprising carrier waves modulated in frequency over a given frequency deviation range in accordance with composite video signals, inclusive of deflection synchronizing components and picture signal components, said recorded picture information occupying a first plurality of the groove convolutions; and (2) end-of-recording information, comprising undeviated carrier waves at a frequency within said given deviation range, occupying a second plurality of the groove convolutions adjacent to said first plurality; the combination comprising:

a rotatable turnable for supporting a disc record;

pickup apparatus including: (1) a pickup enclosure subject to radial motion relative to said turntable; (2) a pickup arm pivotally mounted in said enclosure; (3) a stylus supported by said pickup arm; and (4) pickup circuits coupled to said stylus for developing a carrier wave output in response to stylus traversal of successive disc record groove convolutions, under playback conditions inclusive of (a) rotation of said turntable, (b) radial motion of said enclosure, at a predetermined play speed, in a first direction away from a rest position for said enclosure, and (c) positioning of said pickup arm in a playback position permitting stylus engagement with the spiral groove of a disc record supported by said turntable;

an FM detector responsive to a carrier wave output of said pickup circuits for developing a detected signal output;

means for processing said detected signal output of said FM detector to develop an output composite video signal;

means coupled to said processing means for separating deflection synchronizing components from other composite video signal components;

means coupled to said FM detector for identifying departures of the instantaneous frequency of the input to said detector from said given frequency deviation range;

means responsive to an output of said departure identifying means for developing a squelch signal upon the occurrence of sustained departures of said instantaneous frequency, said squelch signal being utilized to inhibit output composite video signal development by said processing means;

means, responsive to the outputs of said squelch signal developing means and said synchronizing component separating means, for developing an end-of-play control signal; and means responsive to the output of said end-of-play control signal developing means for terminating disc record playback.

4. Apparatus in accordance with claim 3, wherein said end-of-play control signal developing means comprises means for initiating end-of-play control signal development upon a simultaneous absence of outputs from said squelch signal developing means and said synchronizing component separating means enduring for a given length of time.

5. Apparatus in accordance with claim 4, wherein said playback terminating means responds to end-of-play control signal development by effecting (a) retraction of said pickup arm from said playback position, (b) termination of pickup enclosure motion in said first direction, and (c) initiation of pickup enclosure motion in a second direction toward said rest position.

6. Apparatus in accordance with claim 4 wherein said playback terminating means responds to end-of-play control signal development by effecting (a) de-energization of said arm position controlling means to cause retraction of said pickup arm from said playback position, (b) termination of pickup enclosure motion in said first direcion, and (c) initiation of pickup enclosure motion in a second direction toward said rest position.

7. Apparatus in accordance with claim 4 wherein said squelch signal developing means includes:

means responsive to an output of said departure identifying means for developing a defect indication signal, in response to a departure identification, which has a duration that stretches beyond the termination of the departure identification; and means responsive to said defect indication signal for initiating the development of said squelch signal when said defect indication signal endures for a predetermined time period.

8. Apparatus in accordance with claim 7 wherein said predetermined time period of endurance of said defect indication signal is long relative to the recurrence period of said synchronizing components, and is short relative to said given length of time of simultaneous absence of outputs.

9. In playback apparatus for disc record having a spiral groove containing: (1) recorded picture information, comprising carrier waves modulated in frequency over a given frequency deviation range in accordance with composite video signals, inclusive of deflection synchronizing components and picture signal components, said recorded picture information occupying a first plurality of the groove convolutions; and (2) end-of-recording information, comprising undeviated carrier waves at a frequency within said given deviation range, occupying a second plurality of the groove convolutions adjacent to said first plurality; the combination comprising:

pickup apparatus for developing, during disc record playback, a carrier wave output in response to traversal of successive disc record groove convolutions; said pickup apparatus including a pickup stylus subject to movement between an elevated position precluding disc groove engagement by said stylus and a depressed position permitting disc groove engagement by said stylus;

means responsive to said carrier wave output for recovering said deflection synchronizing components, when present;

means responsive to removal of said stylus from said depressed position for developing a squelch signals; and means, responsive to the continuance for a given time period of a simultaneous absence of (1) deflection synchronizing components from the output of said recovering means and (2) squelch signal development by said developing means, for automatically terminating said disc record playback.

10. In playback apparatus for a disc record having a spiral groove containing: (1) recorded picture information, comprising carrier waves modulated in frequency over a given frequency deviation range in accordance with composite video signals, inclusive of deflection synchronizing components and picture signal components, said recorded picture information occupying a first plurality of the groove convolutions; and (2) end-of-recording information, comprising undeviated carrier waves at a frequency within said given deviation range, occupying a second plurality of the groove convolutions adjacent to said first plurality; the combination comprising:

a rotatable turntable for supporting a disc record;

pickup apparatus including: (1) a pickup enclosure subject to radial motion relative to said turntable; (2) a pickup arm pivotally mounted in said enclosure; (3) a stylus supported by said pickup arm; (4)

energizable means for controlling the position of said pickup arm; said arm position controlling means, when energized, serving to position said pickup arm in a playback position permitting stylus engagement with the groove of a disc record supported by said turntable; and (5) pickup circuits coupled to said stylus for developing a carrier wave output in response to stylus traversal of successive disc record groove convolutions, under playback conditions inclusive of (a) rotation of said turntable, (b) radial motion of said enclosure, at a predetermined play speed, in a first direction away from a rest position for said enclosure, and (c) positioning of said pickup arm in said playback position;

an FM detector responsive to a carrier wave output of said pickup circuits for developing a detected signal output;

means for processing said detected signal output of said FM detector to develop an output composite video signal;

means coupled to said processing means for separating deflection synchronizing components from other composite video signal components;

means for developing a squelch signal in the absence of energization of said arm position controlling means, said squelch signal being utilized to inhibit output composite video signal development by said processing means;

means, responsive to the output of said squelch signal developing means and said synchronizing component separating means, for developing an end-of-play control signal; and means responsive to the output of said end-of-play control signal developing means for terminating disc record playback.

11. Apparatus in accordance with claim 10 wherein said end-of-play control signal developing means comprises means for initiating end-of-play control signal development upon a simultaneous absence of outputs from said squelch signal developing means and said synchronizing component separating means enduring for a given length of time.

12. Apparatus in accordance with claim 11 also including means coupled to said FM detector for identifying departures of the instantaneous frequency of the input to said detector from said given frequency deviation range; and wherein said squelch signal developing means is additionally responsive to the output of said frequency departure identifying means.

13. Apparatus in accordance with claim 12 wherein said squelch signal developing means includes:

means responsive to an output of said departure identifying means for developing a defect indication signal, in response to a departure identification, which has a duration that stretches beyond the termination of the departure identification; and means for initiating the development of said squelch signal when either (a) defect indication signal development occurs and endures for a predetermined time period, or (b) de-energization of said arm position controlling means occurs.

* * * * *